United States Patent
George, Jr.

(10) Patent No.: US 6,651,433 B1
(45) Date of Patent: Nov. 25, 2003

(54) BRAYTON SCREW ENGINE WITH BRAYTON BOTTOMING SYSTEM

(76) Inventor: Leslie C. George, Jr., 2520 Pine St., New Orleans, LA (US) 70125-4049

( * ) Notice: Subject to any disclaimer, the term of this patent is extended or adjusted under 35 U.S.C. 154(b) by 0 days.

(21) Appl. No.: 10/243,461

(22) Filed: Sep. 13, 2002

(51) Int. Cl.[7] .............................. F01K 23/10
(52) U.S. Cl. ....................... 60/618; 60/616; 60/614
(58) Field of Search ..................... 60/597, 614, 616, 60/618, 605.1, 598

(56) References Cited

U.S. PATENT DOCUMENTS

| | | | |
|---|---|---|---|
| 3,224,199 A | 12/1965 | Best | |
| 3,630,022 A | 12/1971 | Jubb | |
| 4,089,176 A | 5/1978 | Ashe | |
| 4,215,553 A | 8/1980 | Poirier et al. | |
| 4,258,677 A | 3/1981 | Sanders | |
| 4,910,414 A * | 3/1990 | Krebs | 290/2 |
| 5,035,117 A * | 7/1991 | Drake | 62/79 |
| 5,121,607 A | 6/1992 | George, Jr. | |
| 5,241,817 A | 9/1993 | George, Jr. | |
| 5,309,492 A | 5/1994 | Adams | |
| 6,301,890 B1 * | 10/2001 | Zeretzke | 60/616 |
| 6,371,878 B1 * | 4/2002 | Bowen | 475/5 |
| 6,553,764 B1 * | 4/2003 | Gladden et al. | 60/608 |

* cited by examiner

*Primary Examiner*—Hoang Nguyen
(74) *Attorney, Agent, or Firm*—Lawrence E. Laubscher, Jr.

(57) ABSTRACT

An improved power system that recovers heat energy from the exhaust of internal combustion utilizing an internal combustion engine in combination with a Brayton bottoming system. Heat from a thermal battery drives the bottoming system to create electrical power that supplements the engine power. Sources of heat for the thermal battery include hot engine exhaust gasses, electrically generated heat, and residual heat from motor/generators.

15 Claims, 7 Drawing Sheets

BRAYTON SCREW ENGINE WITH BRAYTON BOTTOMING SYSTEM

BACKGROUND OF THE INVENTION

The present invention relates to improvements in the efficiency of internal combustion engines within combined-cycle power plants.

BRIEF DESCRIPTION OF THE PRIOR ART

Combined-cycle power plants are known and are becoming dominant in the larger engine power industry, particularly in fixed-plant applications. Commonly, these power plants include gas turbine generators exhausting to Rankine cycle steam generating plants and are found in large installations with gas turbine generators rating as high as 390 megawatts with a claimed thermal efficiency of 58% for the combined cycle. Conventional gas turbines consist of a bladed compressor and a bladed expander mounted on the same shaft. The compressor, as distinguished from positive displacement engines, must run at high RPM to pump air at low pressure. The resulting large mass flow of high temperature air requires large heat recovery equipment. Systems of this type generally operate continuously at full load, because both efficiency and torque drop considerably with a reduction of size, speed or load.

The configuration of a screw engine is comparable to that of a gas turbine to the extent that both include a compressor, a combustor, and an expander. Largely for this reason, screw engines are commonly mis-identified as screw turbines when, in fact, they are positive displacement mechanisms comparable to a piston engine. The close clearances of screw engines make them self-cleaning, free of the deposits that build up in the bladed compressor of a gas turbine. Air-fuel ratios can be maintained at optimum levels over the range of operation, so there is no excess air and mass flow. The result is higher exhaust temperatures, permitting the use of smaller heat recovery units. Further, the expander may be equipped with an expansion ratio modulation system, as is commonly known in screw engine applications. Under low load conditions, there could be an over-expansion of the gasses, resulting in a power drag on the unit. A capacity control modulation system results if slots are cut in the first compressor stages. Opening a slide valve vents these stages to the inlet end of the unit to delay compression. Similar slots in the screw expander at the exhaust end give similar early exhaust at low loads.

Combined-cycle power systems are also found in vehicles such as large trucks, locomotives and busses. Regenerative vehicle braking systems have been developed using flywheels, where the braking energy speeds up a flywheel to store energy which is later used to propel the vehicle. The Swedish Cumulo system uses braking energy to pump oil into a chamber at up to 6,000 psi. The pressure energy is then used to accelerate the vehicle. This system requires heavy duty piping and components which reduce the vehicle's payload carrying capacity. Electric drive power systems, generally known as hybrid systems, are also known. An engine drives a generator, which in turn powers the electric drive motor. On braking, computer control changes the drive motor to generator mode and electricity is fed back into a battery grid. This system has a limited amount of energy storage and, when the storage limit is reached, further braking energy is wasted.

Current submarine propulsion systems have unique problems due to the desirability of remaining submerged for long periods of time while retaining the capability of moving at high speeds. At present, the world naval submarine fleet numbers almost seven hundred boats—some of which are nuclear. Nuclear submarines have the ability to submerge and stay under water for weeks or even months. However, they are large, heavy, and very costly to build and operate. They are also designed to meet the Cold War need for difficult-to-detect, deep ocean, strategic nuclear weapons platforms. Because of their size, they are not suitable for the littoral warfare foreseen for the present and near future.

The great majority of the world's submarines have non-nuclear diesel-electric propulsion systems. For the cost of a nuclear submarine, four or more diesel-electric submarines could be built which would be equal to or better in agility, maneuverability, and quietness than nuclear submarines. Since the advent of the submarine, however, designers have been faced with the problem that the conventional non-nuclear submarine required two power systems for propulsion—internal combustion engines for surface use and battery charging, and battery systems when submerged. Diesel-electric submarines must surface (at least to periscope depth) often, depending upon their use of battery power. Surfacing to charge batteries takes time, during which the submarine is most vulnerable to detection.

In order to extend submerged time for diesel-electric submarines, various air-independent propulsion (AIP) systems have been developed. These systems are generally not over three hundred horsepower and commonly only extend the use of the batteries. They could be used directly to provide propulsion power, but only at relatively slow speed. Higher speeds would drain the propulsion batteries, and flank speed would likely drain the batteries within a few hours. Present AIP systems are offered for retrofitting in older boats. To accommodate the system, a plug, equal to the diameter of the hull, must be installed in the submarine. This makes the submarine heavier, longer, and less maneuverable. AIP systems in the prior art include Stirling engines, MESMA systems, fuel cells, and closed cycle diesels.

The Stirling engine is used in the Swedish Kockums design. The design uses two or more Stirling engines, which require a special fuel oil, as well as liquid oxygen (LOX), naphtha for the AIP, and diesel fuel. The French MESMA system uses a simple Rankine cycle, with a high consumption of fuel oil and LOX. The steam pressure generated is approximately 260 psi and the closed combustion pressure is approximately 870 psi, which makes it possible to blow the exhaust overboard at great depth. Both the Swedish and the French systems operate on a closed cycle with continuous combustion. Resulting carbon dioxide ($CO_2$) is not detrimental to the combustion process and is used as the working fluid. Other combustion products include water and other non-combustible gasses.

The fuel cell has been touted as the power system of the future, for both vehicle and marine power. It has a number of problems, including high weight/horsepower ratio and high fabrication costs due to utilization of costly materials. Submarines equipped with fuel cells must carry fuel oil for the diesels as well as LOX and hydrogen for the fuel cells. The hazards associated with hydrogen make this a questionable material to be carried on a military vessel. Finally, thermal efficiency at low speeds falls off as speed and power demands increase. Balancing these problems is the absence of exhaust pollution, for the sole fuel cell by-product is pure water.

The addition of any of the above AIP systems makes it possible for a submarine to remain submerged for weeks at a time provided they are operated at 4–5 knots and the main propulsion batteries are not drawn upon. At any higher speed, main batteries must be used, and the submarine may have to surface several times in one day to charge the batteries. These AIP systems add to the length and weight of the submarine in new construction, and in retrofitting an older boat the previously mentioned plug is required. For example, the French MESMA system adds 270 horsepower to the submarine, yet adds 250 tons to its weight and 33 feet to its length. The result includes increased water resistance under speed as well as a reduction in maneuverability.

The closed cycle diesel system is the only proven AIP system that propels the submarine both on the surface and when submerged. The system requires diesel fuel, oil, oxygen and argon for submerged closed-cycle operation.

All of the systems described above except the fuel cell generate carbon dioxide as a by-product. A closed cycle diesel must remove the carbon dioxide from the working fluid because carbon dioxide delays fuel combustion. Exhaust generally passes through an absorber where sea water removes the carbon dioxide ($CO_2$) and the remaining gas returns to the closed cycle. The problem may be further remedied by the injection of argon gas. This is not necessary in the MESMA system and the Stirling engine because their fuel combustion is constant and there is time for adequate combustion. MESMA and Stirling AIPs commonly use carbon dioxide as the working fluid.

The prior art reveals many deficiencies which would benefit from a significant improvement in the design and efficiency of a combined internal combustion and electrical power system which can be utilized in open, closed, or semi-closed cycle modes.

SUMMARY OF THE INVENTION

Accordingly, it is a primary object of the invention to significantly improve the energy efficiency of combined cycle power plants by incorporating an internal combustion engine and a Brayton Bottoming System. The system recovers heat from the exhaust of internal combustion engines by means of an open or closed bottoming cycle utilizing the compression or expansion of the working fluid. The internal combustion engines are preferably of the screw design. Although a screw engine is most suitable, any internal combustion engine with a hot exhaust could be used. Alternatives include a Wankel-type rotary engine, a Sterling engine, or a gas turbine. The secondary system is preferably a Brayton Bottoming System (BBS) in which compressed gaseous fluid is pumped through a heat exchanger and then expanded utilizing screw expanders and a positive displacement screw compressor with a modulation control valve to permit variable speed operation. With the inclusion of energy storage in a thermal battery, the system would have an attractive power to weight ratio, with a high power density. Ambient air would likely be utilized in an open cycle such as would be used with road vehicles. In a closed cycle, such as in submarines or in a mine vehicle, the working fluid might be an inert gaseous fluid such as nitrogen or carbon dioxide.

In a preferred embodiment, the engine is either a turbine or piston-driven type. Turbine rotors are preferably made of high temperature material, and the engine may be considered an adiabatic or near-adiabatic engine. Mass flow is reduced by building a turbine and a screw compressor with both the compressor and the turbine on the same shaft, or with a reduction gear. Small turbines have a compression ratio of about 3.5:1, while a screw compressor would make possible a ratio of 30:1. Either of these configurations would have continuous combustion, which would have environmental benefits and would be quieter than a diesel engine. Many critical engine components such as bearings are made of self-lubricating, non-magnetic ceramic. Cerbic or Noralide bearings made by Norton are commercially available and withstand temperatures of 1832° F. and 2370° F., respectively. Use of such bearings allows the lubrication system to be minimized or dispensed with entirely.

For vehicle applications, regenerative braking is used to pump compressed air to a high pressure storage tank. In run mode, this compressed air is routed through the heat exchanger and then expanded to assist in propelling the vehicle. In an electric propelled vehicle in regenerative braking mode, the drive motor can change to generator mode and use the kinetic energy of the braking vehicle to heat the thermal battery in the heat exchanger to further heat the air or other gaseous fluid to be expanded. The two methods of regenerative braking are computer controlled and may be used either separately or in tandem. With the first method, braking causes the computer to convert a drive motor to generator mode. The resulting electrical energy is used to heat a high capacity thermal battery. With the second method, the main drive motor, when operated in generator mode, pumps pressurized gaseous fluid into a storage tank. Upon returning to drive mode, this compressed gaseous fluid is led through a thermal heater and then expanded to produce drive power for the vehicle.

The invention in closed cycle mode is particularly suitable for marine applications, which would not utilize regenerative braking. Naval applications, including mine sweepers and submarines, would preferably employ an adiabatic engine of non-magnetic ceramic construction. A screw engine is favored because of its inherent high power density, high temperature exhaust, and quieter continuous combustion.

Accordingly, it is an object of the present invention to provide a power system that will propel a submarine at full speed, whether surfaced or submerged, and that will permit the vessel to remain submerged for the greater or whole part of a mission, the power system running on fuel oil and oxygen supplied from a store of liquid oxygen.

It is also an object to utilize regenerative braking to maximum efficiency in wheeled vehicles having combined-cycle propulsion.

It is a further object to utilize a thermal battery to improve the efficiency of a combined-cycle power plant.

It is a still further object to improve the efficiency of combined cycle power plants by combining a screw turbine with a Brayton Bottoming System.

It is also an object to operate a turbine at variable speeds without significant power loss.

An engine having these and other advantages includes an internal combustion engine driving a first motor/generator; a heat exchanger; means connecting the engine and heat exchanger for providing heat generated by the engine to the heat exchanger; a first expander driving a second motor/generator; means connecting the heat exchanger and the first expander for providing heat from the heat exchanger to the first expander; a third motor/generator; and means for providing power between at least one of the first and second motor/generators to the third motor/generator.

BRIEF DESCRIPTION OF THE FIGURES

Other objects and advantages of the invention will become apparent from a study of the following specification when viewed in the light of the accompanying drawings, in which.

DETAILED DESCRIPTION OF THE INVENTION

Figure 1:
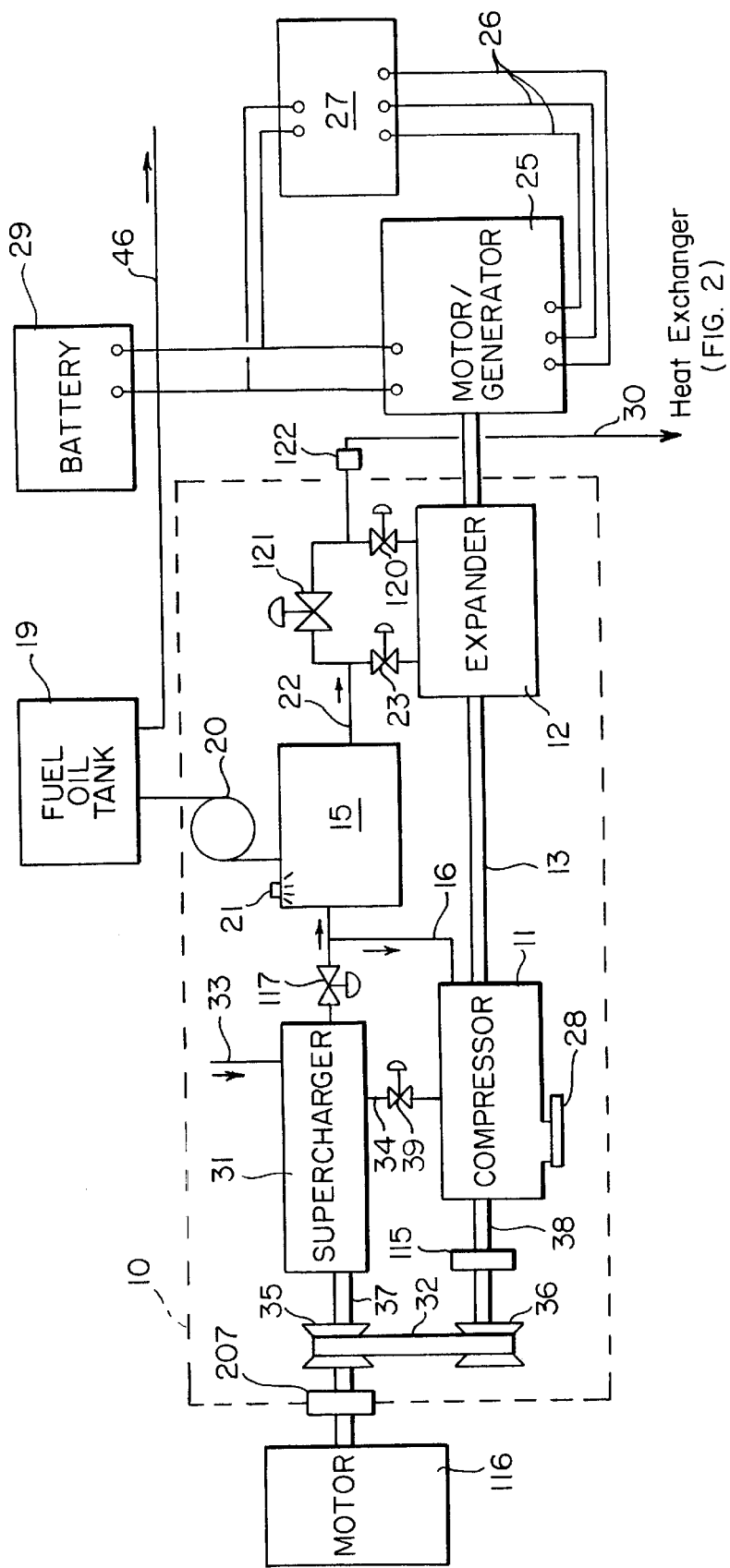
FIG. 1 is a schematic diagram illustrating a screw engine suitable for the energy recovery system according to the invention.

The embodiment of FIG. 1 is a primary internal combustion power unit in accordance with the invention, the residual heat from which powers a secondary Brayton Bottoming Cycle (FIG. 2), both of which are utilized to propel a vehicle. With reference first to FIG. 1, a screw engine 10 is configured as a gas turbine with a variable capacity compressor 11 and an expander 12 connected by a drive shaft 13. While a screw engine is the preferred type of engine for, a screw compressor turbine, a Wankel rotary engine, or a diesel would be suitable alternatives. A primary drawback of the diesel would be that it would not have the elevated exhaust temperatures of the other identified alternatives. A conventional gas turbine could also be utilized in the invention (FIG. 5); however, a screw compressor permits higher combustion pressures to be achieved. Similarly, an alternative embodiment may employ a gearing system between compressor 11 and expander 12 to allow different drive ratios. The gas turbine may also have a variable output, controlled by modulation valve 28.

Compressor 11 pumps gaseous fluid to a combustor 15 via discharge duct 16. Fuel oil from tank 19 is supplied to combustor 15 by pump 20 and ignited by ignitor 21. The resulting gas is supplied by duct 22 through open valve 23 to expander 12, which drives motor/generator 25 in generator mode. Electrical power is routed via wires 26 to motor/generator 27, which propels the vehicle. Engine 10 will preferably be a low cooled or non-cooled engine constructed of ceramic material such as silicon nitride, with self-lubricating bearings such as Noralide silicon bearings capable of operating at temperatures up to 2,370° F. Bearings of this type are commercially available. The exhaust gas from expander 12, which will have a temperature of about 1,800° F., will be provided via duct 30 to the primary heat exchanger 40.

Compressor 11 will be advantageously supplied with a screw supercharger 31 driven by a v-belt 32 connecting pulleys 35 and 36. Pulleys 35 and 36 will preferably have computer-controlled variable diameters to permit their speed and output to be varied in relation to that of compressor 11, thereby permitting real-time adjustment of the air/fuel ratio to optimum settings. When superchargers are used, particularly at high speed, only part of the mass flow is used to drive the supercharger. The remainder is "waste-gated," or by-passed, and potential energy is lost. Further, there is a delay in response when additional fuel is fed to the engine. A combustion delay and a time lapse occurs before this addition to the exhaust speeds up the supercharger sufficiently to supply additional air to burn the additional fuel, and exhaust smoking known as "turbo-lag" results. The computer, sensing the demand for acceleration and more fuel and air, will immediately adjust the ratio of the variable diameter pulleys for optimum performance. Contrary to what might be expected, having an engine-driven supercharger does not detract from the power output of the engine when utilized as taught by the invention. By eliminating the exhaust driven supercharger, the exhaust back-pressure is reduced as well as the "pumping loss" of the engine. As a result, there is no power loss from "waste-gating" the supercharger.

Supercharger 31 receives gaseous fluid flow from duct 33 and supplies it to compressor 11 via duct 34. Alternatively, supercharger 31 may be driven by a motor 116 connected to drive shaft 37 through a clutch 207.

Figure 2:
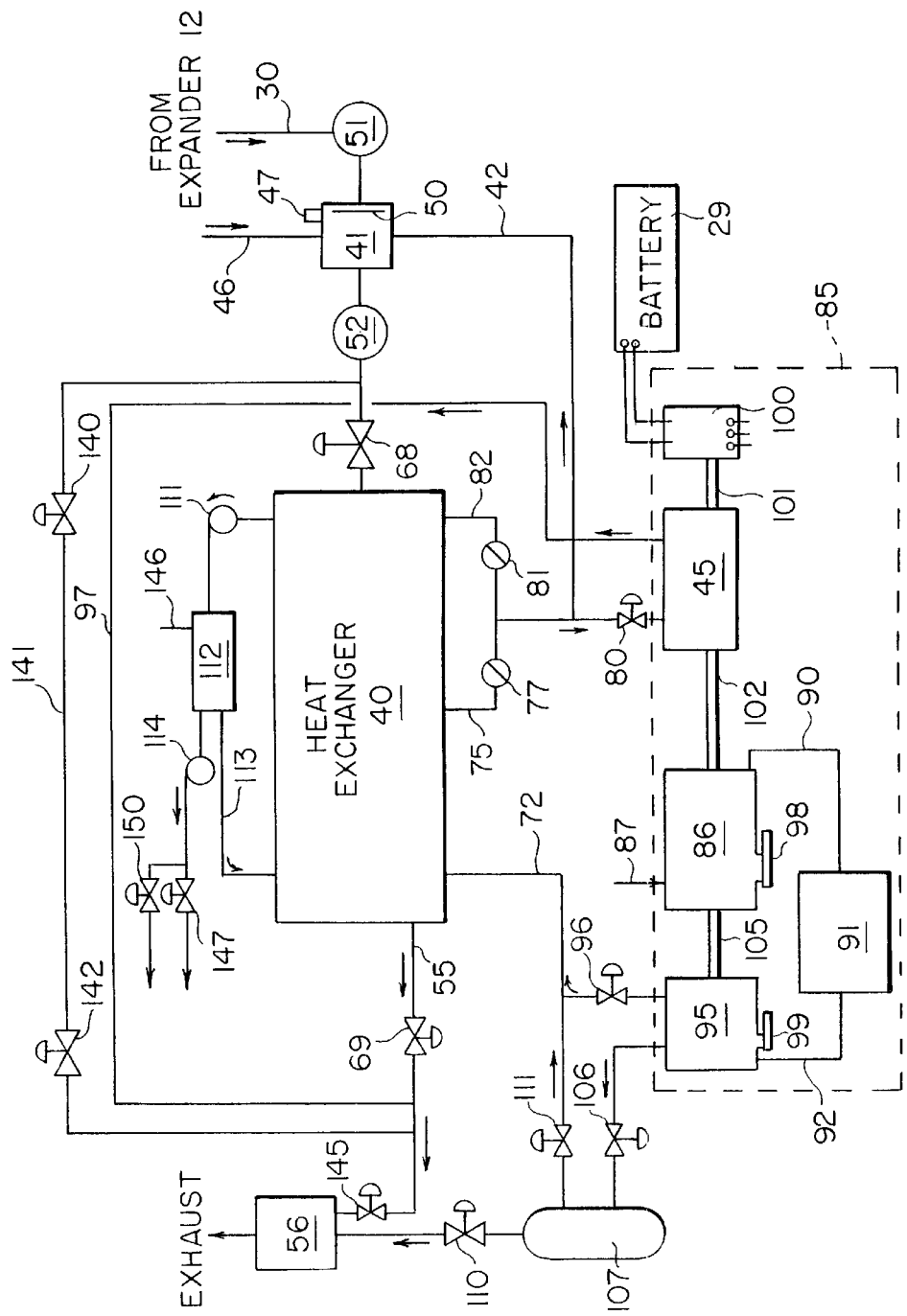
FIG. 2 is a schematic diagram illustrating an embodiment of a Brayton Bottoming System suitable for the energy recovery system according to the invention.

Referring now to FIG. 2., exhaust gas in duct 30 enters heat exchanger 40 through a fuel-fed trap oxidizer 41, where gaseous fluid is supplied through duct 42 from expander 45. Fuel from fuel tank 19 is supplied through fuel line 46. The fuel/air mixture in trap oxidizer 41 is ignited by igniter 47 when filter screen 50 becomes clogged with particulate matter. This condition will be determined by inlet pressure sensor 51 and outlet pressure sensor 52, which will measure the pressure drop across the trap oxidizer and determine that the filter screen is becoming clogged. Upon detection of clogging, the pressure sensors will send a signal to a computer control which will activate the igniter to incinerate the accumulated particulate matter. Heat energy from the burning fuel and particulate matter will be recouped in heat exchanger 40. The trap oxidizer prevents the build-up of deposits within the heat exchanger, which would impede heat transfer, to improve the environmental quality of the exhaust. From heat exchanger 40, exhaust gasses exit via duct 55 and open valve 69 to muffler 56 and the atmosphere. In certain conditions, transit of the gasses through the heat exchanger will quiet the exhaust noise to the extent that muffler 56 may not be needed.

Figure 3:
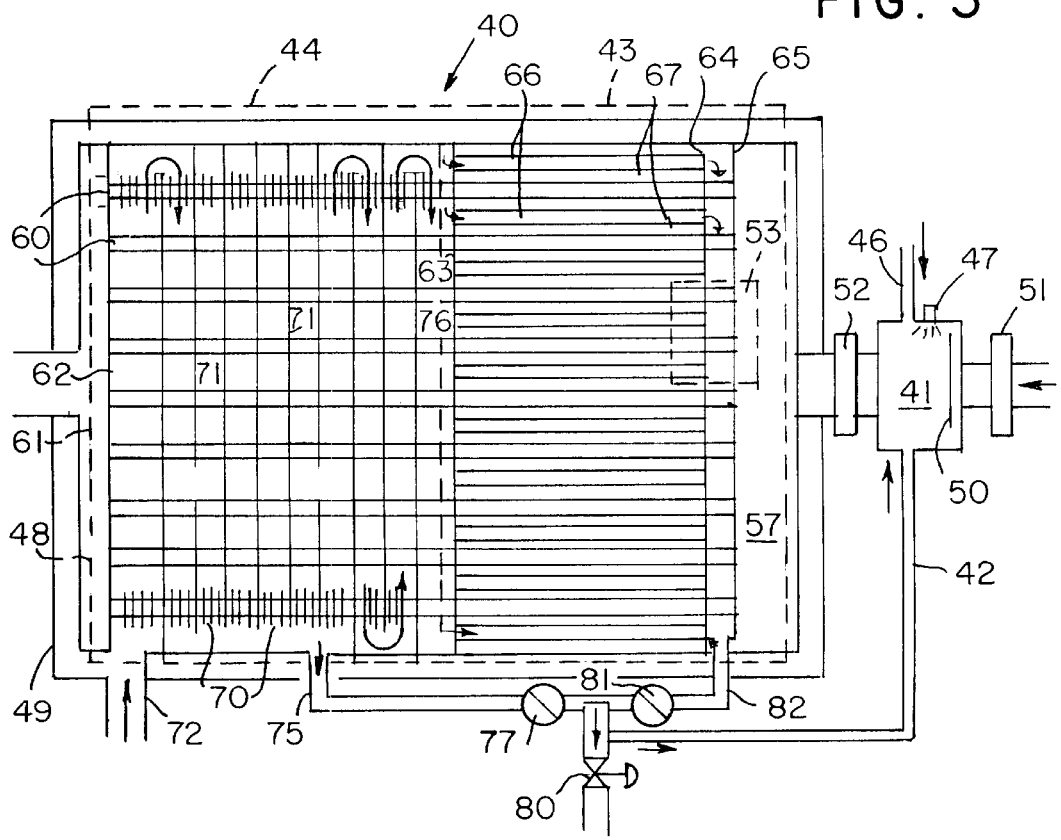
FIG. 3 is a diagram of a preferred heat exchanger suitable for the energy recovery system according to the invention.

Referring to FIG. 3, primary heat exchanger 40 is partitioned into a thermal battery section 43 and a gaseous fluid heater section 44. The heat exchanger will be housed in a container consisting of an inner casing 48 and an outer casing 49. The space between the casings will preferably be filled with high quality insulation. Alternatively, the space might be left empty and a high vacuum maintained to impede loss of heat. Hot exhaust gasses from expander 12 enter heat exchanger 40 through the trap oxidizer 41, which will remove entrained carbon and unburned hydrocarbons by trapping them in filter screen 50. Fouling of the filter screen will eventually cause a pressure drop across the filter, which will be sensed by inlet and outlet sensors 51 and 52 respectively. The pressure drop will be signaled to a computer controller (not shown) which will activate the spark igniter 47. Air supplied by duct 42 is mixed with fuel oil supplied by line 46 in trap oxidizer 4, and the mixture is ignited to burn off the accumulation on the filter screen. The result of this removal of trapped particulate matter and unburned hydrocarbons is significant reduction of environmental pollution and also improved engine efficiency by reduced fouling of the exhaust tubes in the heat exchanger.

Figure 7:
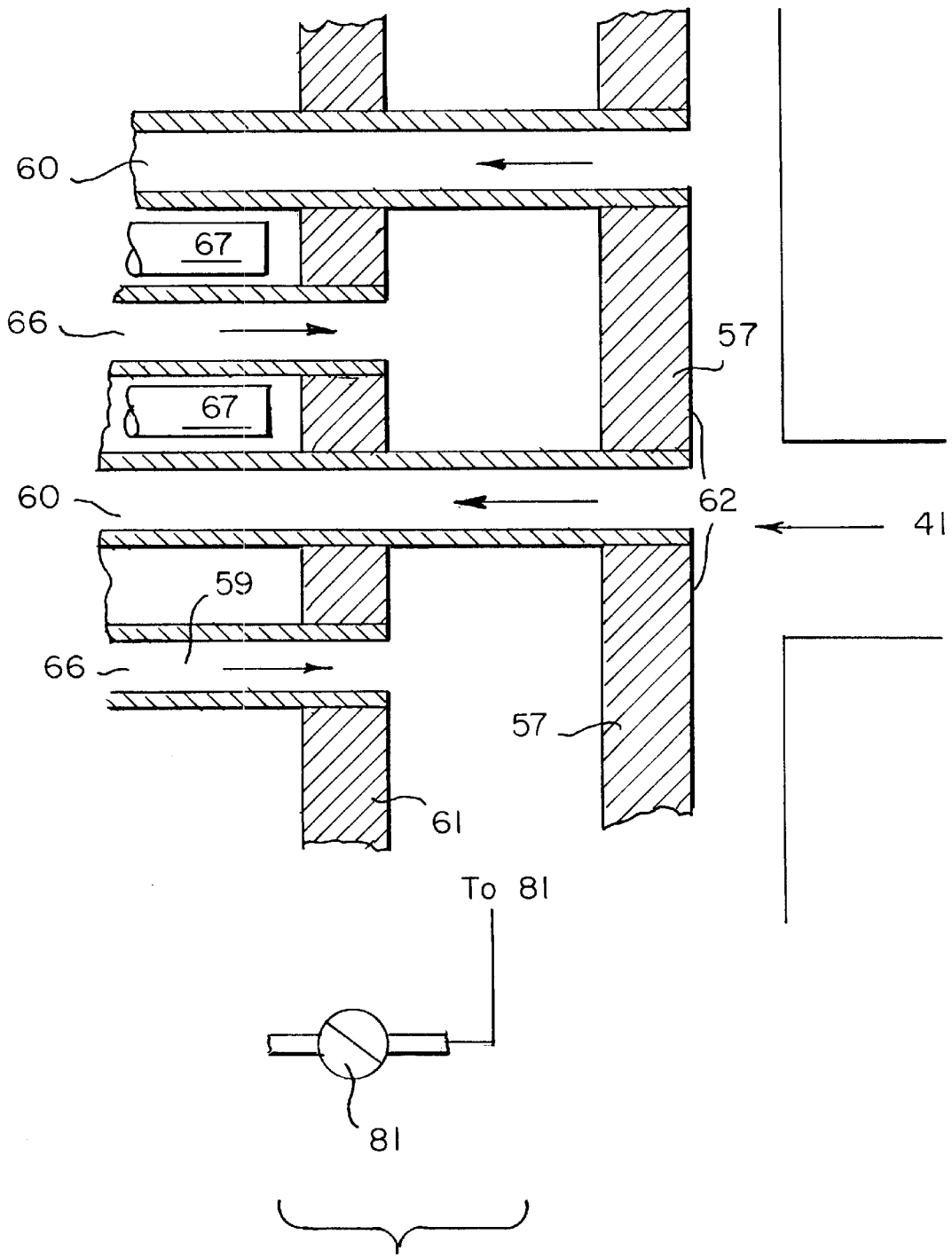
FIG. 7 is a more detailed schematic representation of area 53 of FIG. 3.

FIGS. 3 and 7 illustrate the construction of heat exchanger 40, with FIG. 7 showing in greater detail the area 53 to facilitate a description of the construction of thermal battery 43. From trap oxidizer 41, the hot exhaust gasses enter inlet chamber 57 and pass through straight exhaust tubes 60 into exit chamber 61. Exhaust tubes 60 are rolled into tube sheets 62 in the outlet chamber, tube sheet 65 in the inlet chamber, and tube sheets 63 and 64 within thermal battery 43. The function of the tube sheet 62 is to seal off the exit chamber 61 from the interior of gaseous fluid heater section 44, except to permit the passage of gaseous fluid through ducts 60. Similarly, tube sheet 65 seals off the inlet chamber 57 from the thermal battery section 43, except for the passage of gaseous fluid through ducts 60. Working fluid tubes 66 are rolled into tube sheets 63 and 64 and permit the passage of working fluid heated in the gaseous fluid heater section 44 to pass through the thermal battery section 43 before exhausting through an exhaust duct 82. Electromagnetic induction heating elements 67 surround exhaust tubes 60 within thermal battery section 43. All of the thermal battery elements are bedded in a core of lithium fluoride (see FIG. 4), which melts at 1550° F., carbonaceous graphite for higher temperatures, or some similar material. The working fluid tubes 66 could be made of ceramic or similar material capable of withstanding the high temperatures.

Referring again to FIG. 3, within the fluid heater section 44 of heat exchanger 40, heat from the fluid in tubes 60 transfers to fluid circulating through the heater section 44 as fluid in tubes 60 flows from inlet chamber 57 to exhaust chamber 61. To maximize heat transfer, tubes 60 will preferably be fitted with fins 70 over their entire length within the fluid heater section. Air flow in tubes 60 is unidirectional, flowing only from inlet chamber 51 to exit chamber 61. Baffles 71 will be fitted to force fluid entering inlet fluid duct 72 to pass over fins 70 and around baffles 71. After passing around the final baffle 76, the heated working fluid will be forced through tubes 66 to provide further heating capability for the thermal battery.

Baffles 71 will cause the gaseous fluid to circulate over the finned exhaust tubes 60 for maximum heating. Under normal operating conditions with no great demand for power, the compressed gaseous fluid might be sufficiently heated by passage through fluid heater 44 without utilizing the further heating capabilities of the thermal battery 43. In such case, the gaseous fluid would be directed through outlet duct 75, butterfly valve 77, and throttle valve 80 into screw expander 45 (FIG. 2). It then would pass through duct 97 to muffler 56. In this mode, the screw expander 45 is driving motor/generator 100 (now in generator mode) directly, which provides additional power assist in driving propulsion motor/generator 27 (now in motor mode).

Should further heating of the working fluid be required at this stage, the gaseous fluid would be directed through the high temperature section of thermal battery 43, absorbing heat from the lithium fluoride or graphite core. In such case, butterfly valve 77 would be closed and the gaseous fluid would exit heat exchanger 40 through butterfly valve 81 to throttle valve 80.

The amount of heat stored in thermal battery 43 will usually be higher during regenerative braking when the main driver motor/generator 27 (FIG. 1) is in generator mode. During this process, kinetic energy of the rolling vehicle is converted to electricity to power electric heating elements 67 and provide heat to the thermal battery. Heating elements 67 could also be powered by the motor/generator 25 (FIG. 1) to store heat in the thermal battery, for example, to run the vehicle through an environmentally restricted zone. In this case, the engine might be stopped; hence, no burning of fuel would occur during the transit while the vehicle is propelled by the stored energy in the thermal battery and the residual heat in the gaseous fluid heater. With these operating at maximum capacity, the working fluid running through the thermal battery might be too hot for use in fluid expander 45 (FIG. 2) and cooler fluid from fluid heater 44 will be used. Regulating butterfly valve 77 will admit fluid to a throttle valve 80, passing the fluid to expander 45. As the fluid in heater 44 cools, butterfly valve 81 will open to allow hotter fluid in chamber 57 to pass through valve 80. The opening and closing of valves 77 and 81 permits control of the turbine output and optimum temperature regulation of fluid to expander 45 to ensure operation of the turbine at a steady speed. Stored heat is utilized until exhausted, at which time engine 10 must be restarted to replenish the stored heat or to propel the vehicle. Preferably, an outlet fluid duct 75 will tie butterfly valve 77 into fluid heater 44 about 3 baffles before the fluid reaches the final baffle 76. As illustrated, duct 75 will preferably exit . Butterfly valve 81 will connect directly to inlet chamber 57 via duct 82. For maximum heat from the thermal battery 43, valve 77 will be closed and valve 81 will be fully open.

Heat exchanger 40 is the power source for Brayton Bottoming System (BBS) 85 (FIG. 2), and recovers and stores heat from any or all of motor/generator 25, motor/generator 27, or the exhaust of engine 10.

BBS 85 includes a first stage high-pressure (HP) gaseous fluid compressor 86, which receives ambient air or other gaseous fluid through duct 87 and compresses it to approximately 82 psi. Pressurizing the gaseous fluid heats it to about 320° F. The pressurized gaseous fluid is discharged through duct 90 to intercooler 91, cooled by ambient air, and discharged via duct 92 to second stage high-pressure gaseous fluid compressor 95. The pressurized gaseous fluid, now at about 150 psi, exits through control valve 96 to duct 72 and heat exchanger 40. In the preferred embodiment, working fluid expander 45 is a screw expander and compressors 86 and 95 are screw compressors. Screw machines can be designed with high compression ratios, perhaps up to 25–30:1, with the capacity controlled by modulation valves 98 and 99. Such internal valves are known in the prior art and typically move axially along the bottom of the housing to change the point where compression begins (or expansion ends). Turbines lose efficiency when slowed down. The modulation control valves, however, permit the turbine to be slowed down without losing efficiency for applications such as submarine patrol duty.

One serious problem with internal combustion engines is that the exhaust is more polluting when the engine is running cold than after it warms up. The thermal battery within heat exchanger 40 effectively solves this problem. An air pump 111 may be utilized to take hot air suction from the inlet chamber 57, pump the air through a smaller air heater 112, and then provide it back to heat exchanger 40 through duct 113. An air heater pump 114 may optionally direct hot air through valve 150 to the engine compartment for warming when the engine is off and also through valve 147 to the passenger compartment of a truck or bus. In the case of a vehicle parked overnight or for a weekend, air pumps 111 and 114 could be controlled by a timer to ensure that both the engine and passenger compartments are warm before the beginning of a run.

For wheeled vehicle applications, in addition to powering motor 27, the open cycle BBS will use regenerative braking of two types: a compressed air system and an electrically heated thermal battery system. In the air system, when brakes are applied, drive motor/generator 27 changes to generator mode and vehicle inertia provides power to drive motor/generator 100 in motor mode. Connected drive shafts 101, 102 and 105 transfer energy from motor 100 to compressors 86 and 95. Modulation valves within the compressors will enhance the capacity of the compressors, as a result of which the HP compressor 86 will increase ambient air pressure entering via duct 87 to about 350 psi and compressor 95 will raise the output pressure to about 800 psi. With control valve 96 now closed and stop regulator valve 106 open, the compressed air enters high pressure storage tank 107. At the same time, stop regulator valve 106 will throttle the discharge of the HP compressor 95 so as to put a load on motor/generator 100, now in motor mode, to brake the vehicle. Electrical energy from generator 27 simultaneously powers electric heating elements 67 to heat thermal battery 43. Computer control can balance the stored energy in the compressed air thermal battery to ensure sufficient heat in the battery to heat the quantity of stored air. If, at the beginning of the braking cycle the pressure in the air tank 107 is low, the controlled throttling of the compressor discharge will be required to impose a load on the braking of motor/generator 27 (now in generator mode). Charging of the thermal battery will cease when maximum capacity is attained. However, and contrary to other braking systems, the compressed air system can continue to be used indefinitely. When the capacity of air tank 107 is reached, braking can be continued by compressing the air, with any excess air vented through relief valve 110 to muffler 56. As a result, the vehicle will arrive at the end of the grade with maximum power storage. When the motor 100 is driving compressors 86 and 95, expander 45 is not operating, but it will revolve.

Regenerative braking with the electrically heated thermal battery system can be used as an alternative or secondary embodiment in the invention. When brakes are applied, drive motor 27 becomes a generator to supply electric power for heating elements 67 in thermal battery 43.

Figure 4:
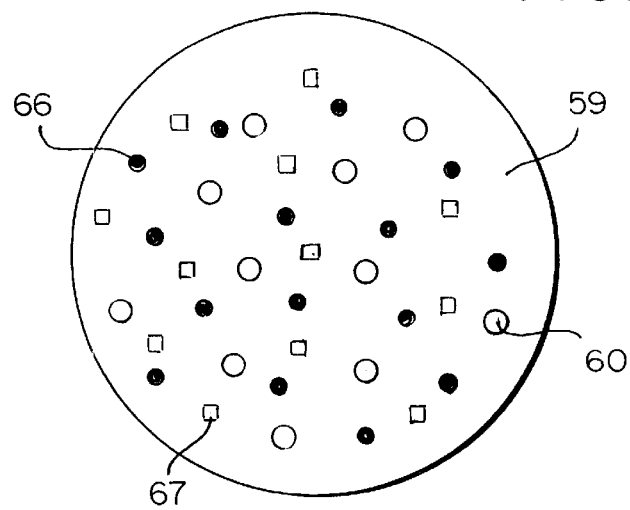
FIG. 4 is a generalized cross sectional view of the thermal battery within the heat exchanger of FIG. 3.

FIG. 4 is a cross-sectional view of thermal battery 43, showing a representative arrangement of elements within a core of heat retentive salts. Exhaust tubes 60—60 carry air from inlet chamber 57 of the thermal battery through heat exchanger 40 to the exit chamber 61 of the fluid heater 44. Working fluid tubes 66 carry air through thermal battery 43 only, and in the opposite direction from the air flow in tubes 60. Heating elements 67 are positioned in proximity to working fluid tubes 66. All space within the thermal battery not occupied by tubes or heating elements is filled by a highly heat retentive core material 59. Desirable core materials include lithium fluoride, which has a melting point of 1550° F. Other materials having known melting points or combinations of such materials could be used to vary the melting point as desired for particular applications. Certain materials such as sodium nitride give great amounts of heat for their weight in the process of cooling from their liquid to a solid state and can store over eight times more power per pound than a lead-acid battery. Temperatures as high as 3000° F. are attainable by using carbonaceous graphite, for example. Thermal batteries employing such high temperature materials as a core can be recharged much faster. With the engine running, the high temperature exhaust passing through the exhaust tubes will heat the working fluid going in the opposite direction. It will also heat the core material, which can impart its heat to the working fluid when required. Heating elements 67 will also heat working fluid tubes 66 as well as core material 63.

In long haul vehicles used in mountainous areas with long grades where continuous retarding could be applied, the thermal battery could be made larger and a higher temperature core would be appropriate. At the end of a grade, the stored heat energy could then be used for propulsion of the vehicle up the next grade. In this application, stop control valve 96 will be closed, stop regulator valve 106 will be closed, and air outlet valve 111 will open. Valve 111 is a reducing valve regulating the high pressure air leaving tank 107 to the normal system operating pressure. The high pressure air enters heat exchanger 40 through duct 72 and exits through duct 75 or 82 as previously described to produce power in expander 45 and power motor 100. Long downgrades would also permit engine 10 to be shut down entirely and the vehicle propelled by the BBS. Any of the motors 25, 27 or 100 could be powered by a battery 29 and used to restart engine 10 before BBS capacity is depleted, whether after a long downgrade run or after overnight parking.

A less efficient embodiment permits the elimination of electrical heating elements 67 from thermal battery 43, with heat for the battery being provided by the exhaust of engine 10. Heat from the thermal battery could be used, not only to power the vehicle, but also to heat the engine on starting. This reduces the level of pollutants, such as unburned hydrocarbons, in the exhaust. Latent heat in the thermal battery could also be used to heat the passenger compartment of the vehicle.

In another mode of operation, thermal battery 43 could be charged from the main engine 10 driving generator 25. Entry into an environmentally restrictive zone might be preceded by fully charging both thermal battery 43 and air tank 107. After shutting down the internal combustion engine 10, the BBS would propel the vehicle through the zone utilizing the battery charging capacity of the thermal battery and the compressed air to drive generator 100 and power motor 27. The vehicle could be propelled in this manner until all of the stored energy has been used.

In stop and go traffic engine 10, instead of running at various speeds and idling, could run at optimum speed to drive generator 25, propel the vehicle, and store excess energy in thermal battery 43 and air tank 107. When both are fully charged, engine 10 could be turned off and the vehicle run off the BBS as previously described. A particular application would include city busses, which stop every three or four blocks to accept or discharge passengers. Once engine 10 has fully charged the thermal battery and compressed air storage capacities, it would be turned off and the stored energy could electrically propel the vehicle possibly for several stops before it would become necessary to restart engine 10.

Should engine 10 become inoperable, clutch 115 mounted on shaft 38 (FIG. 1) will be disengaged. Clutch 207 will be engaged and valve 39 will be closed to prevent flow of fluid from supercharger 31 to compressor 11 through duct 34. Supercharger drive motor 116 will cause supercharger 31 to pump air directly to combustor 15 through open valve 117. Expander inlet and exit valves 23 and 120, respectively, will be closed and valve 121 will be opened to direct hot combustion gas through a Lambda $O_2$ sensor 122 and on through duct 30 to the heat exchanger. In this mode, generator 25 will be the only source of generated power on the vehicle, supplying power to the supercharger drive motor 116 and the main propulsion motor 27 to propel the vehicle.

Similarly, a malfunction or breakdown of the BBS will still permit the vehicle to be propelled by engine 10 alone, in which case the exhaust gas should go through trapoxidizer 41. Specifically, exhaust gas will be exhausted from expander 12 through Lambda $O_2$ sensor 122, through duct 30 to trap-oxidizer 41. Valves 68 and 69 will be closed off to prevent movement of exhaust gas into heat exchanger 40, and valves 140, 142 and 145 will be opened to permit movement of exhaust gas through duct 141 to muffler 56.

A gas turbine can be used as the internal combustion engine 10 in the invention; however, it tends to be inefficient due to low compression if combined with a bladed compressor. Open cycle gas turbines require a large air mass flow, as air is used as an oxidant as well as the working fluid. Since most of what passes through the turbine is hot air rather than the product of combustion, huge mass flow is achieved except when air intake is constricted by a submarine snorkel tube. By substituting a semi-closed cycle with $CO_2$ as the working fluid, it is easier to draw in sufficient air to serve as the oxidant. The semi-closed system still would require a high rpm bladed turbine, which is a source of fouling and deposit build-up on the blades. The defects of a bladed compressor are solved with the substitution of a screw compressor. The positive displacement of a screw compressor permits it to run at a lower speed, discharging to a turbine with adjustable nozzles.

Figure 6:
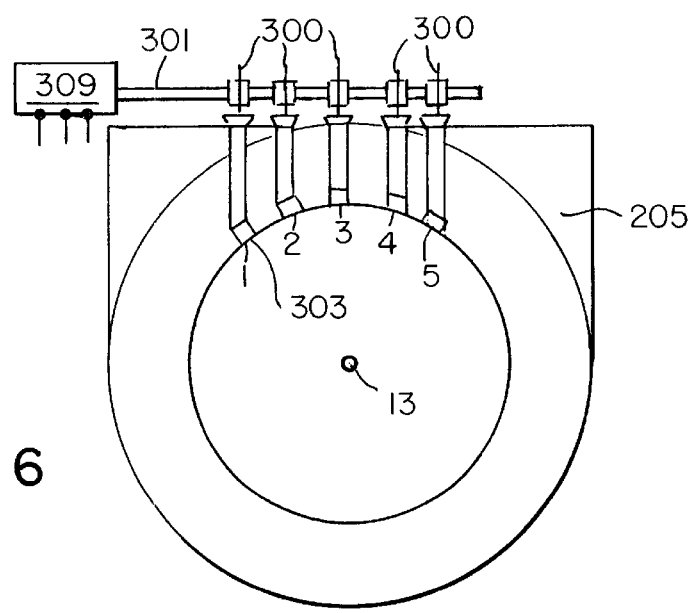
FIG. 6 is a cross-sectional view of the gas turbine of FIG. 5 along section line A—A.
Figure 5:
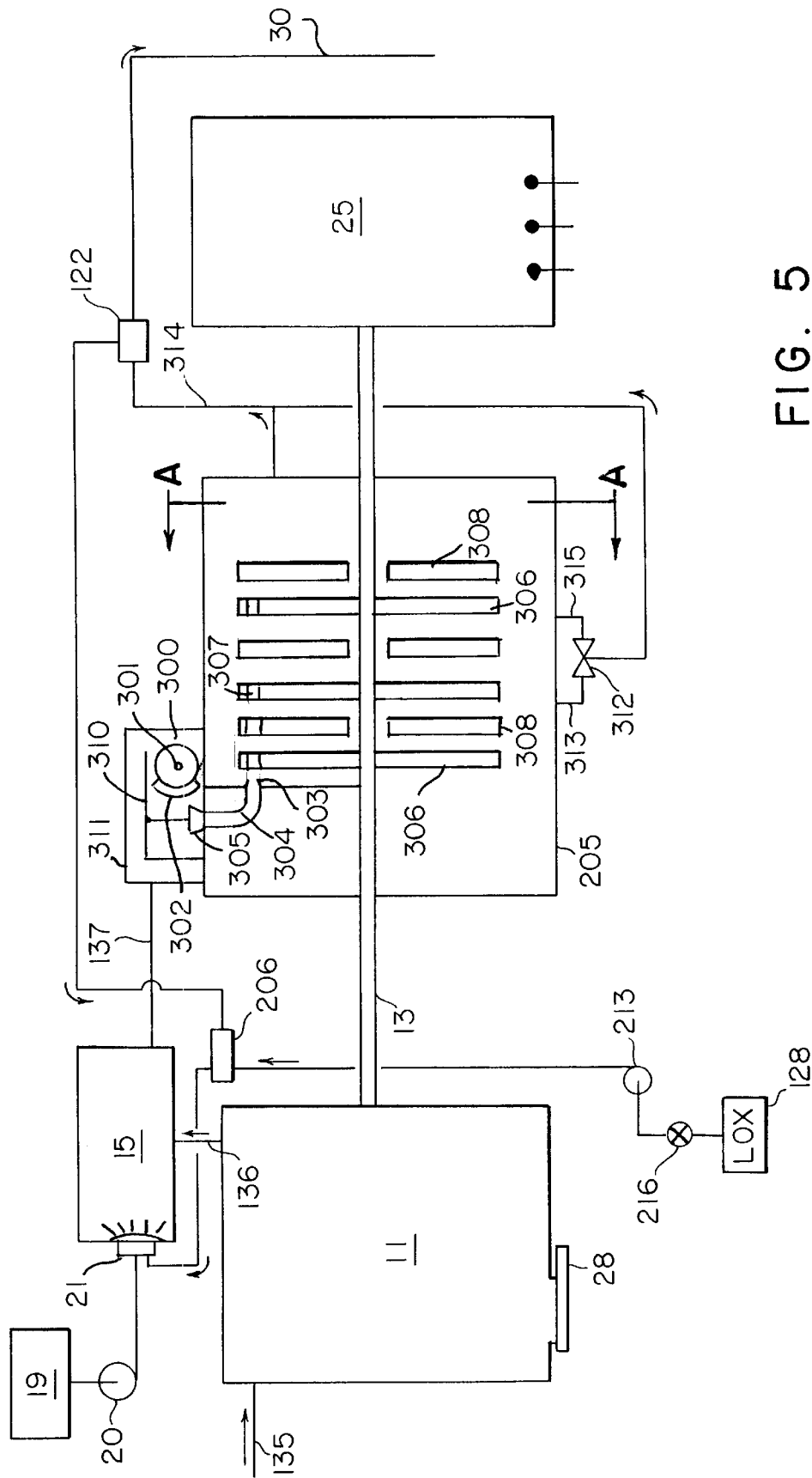
FIG. 5 illustrates a gas turbine utilizing a direct-connected variable output screw compressor.

FIGS. 5 and 6 illustrate a gas turbine utilizing a direct-connect variable output screw compressor. FIG. 6 is a cross sectional view of turbine 205 along section A—A of FIG. 5. A screw compressor 11 connects drive shaft 13 to a gas turbine 205 and motor/generator 25. In operation, compressor 11 draws working fluid through duct 135, compresses the fluid, and directs it to combustor 15 via duct 136. Modulation control valve 28 permits optimum pressure to be maintained in valve chest 311 regardless of turbine or engine speed or load. Fuel oil from fuel tank 19 is ignited by ignitor 21. The resulting hot gasses within combustor 15 are directed into gas turbine 205 via duct 137. Within turbine 205 are a plurality of turbine blades 306 affixed to shaft 13 and interleaved between fixed diaphragms 308 in which are mounted stationary blades. A plurality of nozzle poppet valves 305 are sequentially opened and closed by lifter levers 310 operated by cams 300. A camshaft 301 is rotated by a positioning motor 309. Each cam 300 has a cam follower 302 that effects the sequential opening and closing of valves 305. The speed and output of the turbine may be determined by the amount of hot pressurized fluid admitted through the nozzles. The working fluid pressure will be maintained at optimum for maximum efficiency regardless of the speed output required. A speed increase will necessitate more fuel, at which time computer control will increase the air supply in advance of the fuel increase. Fine tuning of the $O_2$/fuel ratio will be done by Lambda sensor 122, which senses the fluid exiting exhaust duct 314 and provides a signal to $O_2$/fuel controller 206. A pump 213 provides $O_2$ to controller 206 via valve 216 from a LOX storage tank 12, and the regulated $O_2$ will is provided to combustor 15.

At low speed operation, such as submarine patrol duty, the output of compressor 11 is reduced by modulation valve 28, thereby also reducing the capacity of turbo-expander 12. By confining expansion to the first or second stage and providing for early exit of the exhaust gas, windage losses in later stages may be reduced or eliminated. Specifically, a duct 313 is positioned after the first stage row of blades 306 and a duct 315 is positioned after the second stage row of blades 306. Ducts 315 and 315 connect to computer-controlled valve 312, permitting early by-pass of exhaust gasses. Fuel efficiency is significantly increased with this embodiment.

The turbine system described above may be used with a nuclear reactor as the heat source.

Figure 8:
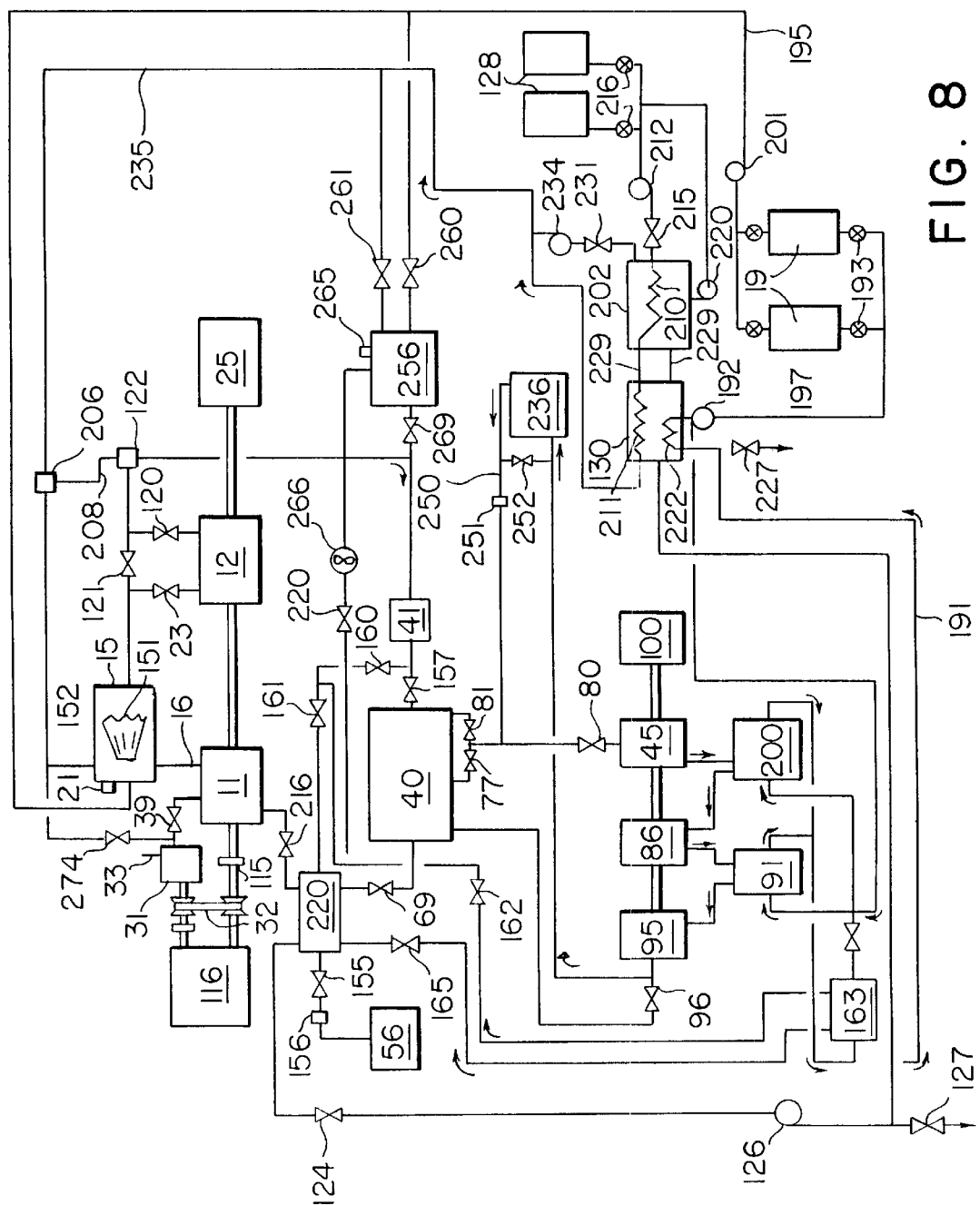
FIG. 8 illustrates an embodiment of the invention suitable for use in closed environments such as mines or submarines.

FIG. 8 illustrates an embodiment of the invention suitable for use in closed environments such as mines or submarines, utilizing the combined-cycle in pressurized closed or semi-closed Brayton Bottoming Systems. A pressurized gas such as $CO_2$, nitrogen or Helium would preferably be used. In the secondary BBS, the sealed gas working fluid is maintained at 300 psi. In the primary system, which will be a closed system, the working pressure will be in the neighborhood of 870 psi. Maintaining higher pressures makes the circuits more efficient, as well as allowing smaller heat exchanger equipment. However, the high pressure of the primary combustion system could be applied to eject the excess combustion gas overboard at depths down to 1,900 feet. In the preferred system, this would not be necessary as a means is described below to condense the exhaust gas, primarily $CO_2$ and water vapor, and hold it aboard.

Operation of the vessel is permitted either submerged or on the surface. With respect to submerged operation, and with reference to FIG. 8, the primary means of propulsion is the screw internal combustion engine 10, consisting as before of a screw compressor 11 driven through shaft 13 by expander 12. Expander 12 will preferably be a unit of screw construction or a bladed turbine with adjustable capacity nozzles, with inlet valves opening in sequence determined by load demand. Operating with high pressure working fluid in the high pressure closed circuit, there is no need for supercharger 31, which may be left disengaged. Compressor 11 will pull exhaust gas from the high pressure circuit through outlet valve 69, through header 220 and valve 99. Compressed gas from compressor 11 then flows to combustor as previously described. Fuel oil tanks 19 supply fuel to combustor 15, and oxygen is supplied from liquid oxygen (LOX) tanks 128 through a Lambda System emission control $O_2$/fuel ratio corrector. A Lambda sensor 122 provides the control input to corrector 206 via control line 208. The mixture is burned in a diffuser 151 that is cooled by the circulation of working fluid through tangential slots 152. Heated working fluid, now at a temperature of approximately 1,800° F., is fed to expander 12 through inlet valve 23 and exhausts through valve 120. The expander drives compressor 11 as well as motor/generator 25, now operating in generator mode. Resulting power is fed to propulsion motos 27, which is operating in motor mode. The working fluid exits valve 120 at about 1,800° F. and passes through Lambda Sensor 122 and trap-oxidizer 41 to heat exchanger 40. Heat exchanger heats the circulating working fluid (typically $CO_2$, nitrogen or helium in a closed cycle maintained at about 300 psi) and directs it through valves 77 or 81, as previously described, through valve 80 to expander 45. Motor/Generator 100 (operating in generator mode) is driven by expander 45 to drive low pressure compressor 86 and high pressure compressor 95. Expander 45 exhausts to a first stage intercooler 200, from which compressor 86 will take suction and compress the working fluid to about 300 psi. From here the working fluid passes through stop valve 96 to heat exchanger 40 for reheating and expansion.

As the exhaust gas from IC engine 10 builds up from the closed cycle combustion process, it must be disposed of. At adequate depth, a high pressure pump might be utilized to discharge the gas overboard Underwater discharge poses a problem to a submarine for several reasons, however. The resulting and noise and bubbles could be discernable to sonar and the hot gasses would likely produce a thermal scar detectable to ultraviolet or other heat sensing devices. Alternatively, the condensed excess $CO_2$ and water vapor may be retained aboard, both to avoid detection and to maintain the weight stability of the vessel, as is described more fully below.

A control valve 124 maintains the working pressure on the primary circulatory system by relieving the excess pressure from exhaust header 220 to an emergency discharge pump 126. Pump 126 could alternative direct the discharge overboard through valve 127 or to water condenser 130. Sea water circulating in coils 222 and oxygen circulating in coils 211 condense the water vapor, which is then removed by a pump 192 through valves 193 to fuel tanks 19, displacing the oil that was previously consumed. The water vapor enters the fuel tank at the bottom and is separated from any remaining oil by a diaphragm 197 made of neoprene or similar material. Excess exhaust will continue through condenser 130 through crossover duct 229 to condenser 202, where it is condensed liquid oxygen flowing through refrigeration coil 210. A pump 212 supplies liquid oxygen from tanks 128 through valves 216 and an expansion valve 215. The expanding oxygen in coils 210 vaporizes and cools rapidly, which cools and liquefies the exhaust gas and causes it to fall to the bottom of condenser 202. From there, pump 220 pumps it through valves 216 into one of the previously emptied LOX tanks 128. The $CO_2$ will remain liquid because of the cold temperature of the LOX tank. Vaporized oxygen will proceed through crossover duct 229 to condenser 130, where it will aid in condensing the water vapor and, becoming warmer, proceed through duct 225 directly to combustor 256 and, via duct 235 and sensor 206, to combustor 15.

Because stoichiometric combustion cannot be obtained in a closed system such as this, about 12% of the oxygen will remain unburned and potentially wasted in the exhaust. Since a submarine might carry nearly 170 tons of LOX, this would amount to 20 tons of LOX wasted. The Lambda Sensor system 206 would bring the combustion process as close as practical to stoichiometric, a recovery method is necessary to return the potentially wasted oxygen to the system. In the refrigerated condenser 202, the $CO_2$ is condensed to liquid as previously described. The entrained oxygen, having a lower condensing temperature, remains non-condensible and may be drawn through duct 230 and valve 231 by pump 234 to be reintroduced into the system in line 235.

Circulating pump 192 supplies cooling water to intercoolers 91 and 200, which is returned via duct 191. The warm water outlet combines with the overboard discharge of condenser 130 through valve 227. This is the only overboard heat dump from the vessel and is of low quantity and at a low temperature.

For submarine applications, thermal batteries can be installed separately from, or in addition to, heat exchanger 40. Any number could be installed,. As previously described, the preferred thermal batteries include one pass tubular heaters embedded in solid sodium chloride or similar material to give off heat when changing from a liquid state to a solid state. Temperatures of 3,000° F. or higher can be attained by using graphite. These batteries do not give off dangerous fumes or gasses when charged and would likely not have to be renewed periodically. They could be utilized for power should there be a malfunction of the main IC engine, or could be used for a quiet approach on patrol. In addition, use of a higher, more efficient speed of the IC engine on slow patrol permits the excess energy to be directed to the thermal storage batteries.

Figure 9:
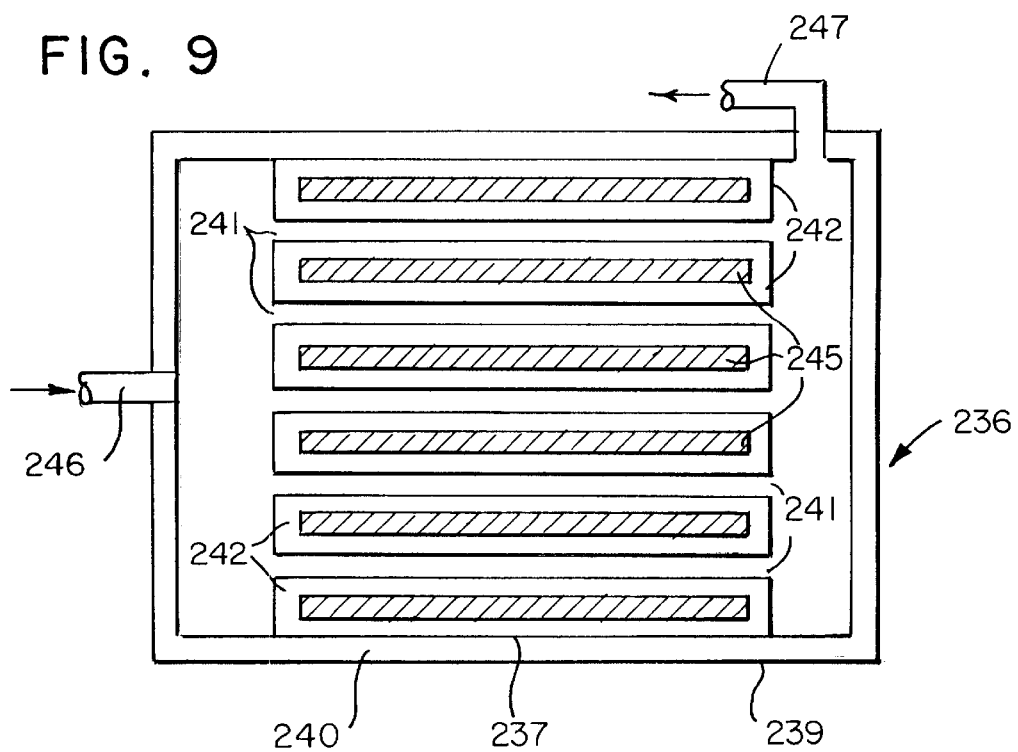
FIG. 9 is a schematic diagram of the thermal battery illustrated in FIG. 8.

FIG. 9 is a schematic diagram of a thermal battery 236 of the type described generally above. The battery 236 is housed in an inner casing 237 surrounded by an outer casing 239. There is a space 240 between the casings that will be filled by efficient insulation material or a vacuum. One pass working heater tubes 241 traverse the battery from inlet 246 to outlet 247 and are embedded in a core of heat retaining material 242 along with electromagnetic heating elements 245.

With reference again to FIG. 8, hot, pressurized gaseous working fluid leaving battery 236 is passed via duct 250 through temperature sensor 251 to expander 45 via valve 80. Sensor 251 controls the fluid by-pass regulator 252 regulate the temperature of fluid to expander 45 by permitting colder incoming gas from compressor 95 to mix with the gas exiting battery 236. Expander 45 drives motor generator 100, now in generator mode, as well as compressors 86 and 95. Expander 45 will exhaust sequentially through intercooler 200, compressor 86, intercooler 91 and compressor 95. At this point, the gas working pressure will approximate 300 psi for discharge back to thermal battery 236.

The thermal batteries do not produce heat but only store it, providing power when on patrol and assisting production of power when there might be a demand for additional power such as when flank speed is required. An emergency combustor 256 is provided to supply hot working fluid in the event IC engine 10 becomes inoperative. In addition to emergency use, however, combustor 256 might also provide power for port operations.

Some lead-acid batteries 259 would likely be retained and could be used for emergency propulsion or power with submerged operations. A closed circuit would be maintained at about 870 psi, the pressure being maintained by the vaporized LOX. Fuel oil is supplied in the usual manner from pump 201 through duct 195 and valve 260 to combustor 256. Oxygen is supplied to the combustor through duct 235 and valve 261. Igniter 265 ignites the combustible mixture and closed circuit working fluid supplied by blower 266 will pass through valve 269 and trap oxidizer 41 to heat exchanger 40. The working fluid exits the heat exchanger and is returned to blower 266 through valve 270. Excess exhaust continues through header 220 to by-pass control valve 124, which directs the working fluid to condenser 130 as previously described.

Should the secondary BBS become inoperable, the primary IC engine can still be run alone, whether submerged or on the surface. When submerged, engine 10 will be operated in the usual manner with a closed working cycle of about 870 psi. Because the secondary system is unavailable to cool the exhaust of expander 12, exhaust would be routed through fuel trap 41 as usual but valves 157 and 161 would closed to permit exhaust to pass through valves 160 and 162 to working fluid intercooler 163. After cooling, the fluid is returned to IC compressor 11 through valve 165, exhaust header 220 and valve 216. Excess exhaust will be led through exhaust header 220 and valve 124 to condensers 130 and 202. For surface operation with the BBS secondary system inoperable, ambient air will be used for combustion with exhaust to atmosphere. Clutch 115 is engaged and compressor 11 will drive supercharger 31 through adjustable v-belt 32. The supercharger will receive working fluid from atmosphere through duct 33 and will discharge to compressor 11 through valve 39. The compressed air will proceed through duct 16 to combustor 15, where it will be mixed with fuel oil and ignited by igniter 21. The hot exhaust gas will enter expander 12 through valve 23, then exhaust through valve 120 to trap-oxidizer 41. Valve 157 will remain closed to permit passage of the gas through valves 160 and 161 to exhaust header 220. From header 200, the gas flows through valve 155 to a generator expander 156 and then to muffler 56. Generator may be used to recover energy from the exhaust gas and will be used to maintain surface working pressure of about 300 psi by throttling the overboard discharge of the gas.

The previously operation of the system when submerged will be modified as described below for surface operations, due to the availability of ambient air as oxidant. The pressure in the secondary BBS will remain at about 300 psi. The 870 psi pressure of the primary system may be reduced to 300 psi and an open cycle would be used. As before, supercharger 31 takes ambient air through duct 33 and is driven by compressor 11 through v-belt 32 with clutch 115 engaged. Air discharges from supercharger 31 to compressor 11 through valve 39, passes through duct 16 to combustor 15, and then through expander 12. The heated and compressed air will pass through Lambda sensor 122 and heat exchanger 40, discharging through valve 69. Because the system is now operating on ambient air and discharging to atmosphere, there is no need to direct the exhaust to condensers 130 and 202 to condense the water vapor and to produce oxygen from the LOX. The exhaust gas will leave valve 69 to exhaust gas header 220 and then through valve 155 to generator expander 156. In this way the remaining energy in the exhaust is used to generate power that will be fed to the grid. The expanded gas will leave generator expander 156 to muffler 56.

If IC engine 10 consists of a screw compressor as well as a screw expander, both are positive displacement mechanisms with a limited air/fuel ratio. During snorkel (surface) operation, sufficient air could be drawn through the snorkel tube, and an open cycle could be used. If a turbine engine were used, a greater air/fuel ratio, resulting in a mass flow several times that of a piston (positive displacement) engine, would be required. This mass flow could be reduced by a turbine engine utilizing a screw compressor with adjustable output utilizing a modulation valve as previously described with a compression ratio of 30:1 or greater. Utilization of nozzles in the turbine as previously described would keep the inlet pressure and volume at optimum. This procedure would reduce the required mass flow, which otherwise could exceed the ambient air capacity of the snorkel.

Alternatively, the mass flow demands described above may be met by using some of the exhaust gas as working fluid in a semi-closed cycle using ambient air as oxidant. Supercharger 31 draws ambient air through duct 33 and discharges compressed air through valve 274 directly into combustor 15. Air and oil are ignited by igniter 21, with the resulting hot air driving expander 12 and exhausting through heat exchanger 40 and valve 69 to exhaust header 220. From exhaust header 220, the gas is directed through valve 216 to compressor 11, repeating the cycle. Excess gas that builds up will be exhausted through generator expander 156 to muffler 56.

Analysis demonstrates the feasibility of storage of the necessary quantity of LOX within existing submarine weight limitations. Fuel oil is approximately seven pounds per gallon and LOX is approximately 9.5 pounds per gallon. U.S. Navy experience establishes that one ton of fuel oil requires 3.4 tons of LOX in a gas turbine, and the same may be assumed to be true for a gas turbine with a screw compressor, or the screw engine covered by this invention. LOX storage aboard the vessel is practical when it is considered that the vessel is propelled by the internal combustion engines and there is no need for propulsion batteries. Therefore, 75% of these batteries would be eliminated, keeping 25% for ship services such as hotel load and communications. Also, the 25% retained could be utilized for an extra quiet mission approach; however, there is no reason to expect that the proposed engines would send an audible signal as is inherent with an explosion engine such as a diesel. Further, such conditions could also utilize the secondary Brayton Bottoming system of this invention, with heat energy from a thermal battery.

No additional weight is taken on by a submarine utilizing the invention, as is readily shown by calculation. According to the technical literature, batteries can take 20–25% of a submarine's weight. Utilizing a much more conservative figure of 14%, a conventional submarine weighing 1,700 tons would include 238 tons of batteries. Elimination of 75% of this weight would make 59.5 tons available for inclusion of the invention. For a normal mission, such a boat would require bunkers of 84 tons. Assuming that the combined cycle of the invention would reduce fuel consumption by 15%, this would be a savings of 12.6 tons. Required bunker for a submarine including the invention would thus require 84–12.6, or 71.4 tons of bunker. Assuming 70% of the mission is run submerged, 71.4 times 0.7 is 49.98 tons of fuel oil burned while submerged. Each ton of fuel oil requires 3.4 tons of LOX, so the added weight of the LOX is 169.9 tons. The added weight of 169.9 tons of LOX required by invention is thus more than compensated for by the saving of 178.5 tons of battery weight and 12.6 tons from fuel efficiency.

Other weight savings could result from the use of the invention. For example, in new construction or retrofitting, the use of permanent magnet motors could save 40% of their weight. The weight, and hazard, of hydrogen required for a fuel cell AIP would be eliminated. It is also likely that the need for a plug lengthening the hull would be unnecessary. No argon gas, as required for the closed cycle diesel, ethanol fuel as needed for the MESMA AIP system, or naphtha fuel necessary for the Stirling AIP system need be stored. Further, the turbine and screw engines utilized by the invention would be much lighter than heavy marine diesel engines.

Further battery weight savings are also likely. For example, the construction of the Brayton Bottoming System heat exchanger will include a thermal battery, which would displace certain of the remaining 60 tons of lead-acid batteries still aboard. This thermal battery is located within the heat exchanger of the BBS. It will consist of a core through which pass exhaust tubes as well as electromagnetic heating elements. The core consists of a solid salt such as lithium fluoride which has a melting point at about 1550° F. Certain. salts give off great amounts of heat for their weight in the process of cooling from their liquid to their solid state. Thermal batteries are superior to the lead-acid battery in that they can be recharged, electrically reheated much faster, and can store over eight times more shaft power per pound. Also, thermal batteries do not give off explosive or poisonous gasses when charging and they do not have to be replaced. A thermal battery core for even higher temperatures could be made of carbonaceous graphite, with heating tubes made of ceramic material.

Aside from the thermal battery installed within the heat exchanger, other thermal batteries could be installed and heated by induction heating elements. In use, these thermal heat storage batteries would allow the internal combustion engines to run at optimum speed and conditions, even at low power demand. The excess power developed would be stored in the thermal battery for later use in propelling the boat. Since the thermal battery would be capable of propelling the submarine at patrol speed, submerged and with the internal combustion engines secured, no LOX will be consumed. It could be fully charged electrically by the internal combustion engines when running on the surface, again with no LOX consumed.

As tons of LOX and fuel oil are consumed, the vessel will become lighter and the buoyancy and stability will be affected. From the internal combustion engines there will be an exhaust which, if blown overside when submerged, would leave behind a thermal scar and produce bubbles on the surface which would be subject to both visible and audio detection. To eliminate this the water vapor should be condensed and pumped into the fuel oil tank in service to balance the weight of the oil being used. There will be in the fuel oil tank a diaphragm of a suitable flexible material such as reinforced neoprene, which will separate the oil and water, allowing the water to replace the fuel as it is consumed. The water vapor in the exhaust will be condensed by sea water, but the temperature of the overboard discharge will not be hot enough to produce a thermal scar. The $CO_2$ in the exhaust will be kept aboard also. The LOX that is vaporized into gaseous $O_2$ will be used in a refrigeration system, which will condense the $CO_2$ and pump it, in liquid state, into an insulated empty LOX tank. There will be in the exhaust gas a certain amount of unburned $O_2$, which is normal for a combustion process. Since aboard a submerged submarine it would mean an unnecessary consumption of the LOX stock, the unburned $O_2$ will be recovered and returned to the working fluid and the combustion process.

Variations on the invention are easily foreseen. In submarine applications, fewer lead-acid batteries might be removed to make a place for LOX storage, such that some of the remaining lead-acid batteries could be replaced by the thermal heat storage batteries. The resulting advantage is faster recharging time of the thermal batteries. The energy of the thermal batteries could be used during slower speed patrols with the engines secured. With a demand for greater power, the stored heat energy could be utilized to augment available power. The thermal battery would have other industrial applications, such as providing power in closed spaces such as to power rail cars in mines.

The single thermal battery described with respect to FIG. 1 is heated electrically or by the exhaust of the fuel engine or turbine. The lithium fluoride core will melt or undergo a change of state within the exhaust temperature of the engine or turbine. One or more auxiliary thermal batteries, however, could be heated solely by electric heating elements to a much higher temperature. A core of sodium, which melts at 2588° F. would significantly increase the thermal storage capacity. Other materials such as carbonaceous graphite would permit even higher temperatures. In such case, the heater tubes and casing would likely be constructed of ceramic materials with double casing and a vacuum maintained to impede heat loss. A steady and adequate engine exhaust temperature can be maintained by running the engine at optimum speed regardless of power demand. The excess power produced will be utilized to heat the auxiliary thermal batteries. Should the batteries be heated to capacity, the engine could be secured and the vessel or vehicle propelled by the stored energy in the thermal batteries. Any number of thermal batteries could be utilized, individually disconnected from the BBS generator/expander when exhausted. The working fluid gas of the BBS is compressed and pumped to the thermal battery for heating, and led back to the BBS expander for power generation. When the temperature of the battery becomes too high for the operating temperature of the BBS expander, the heated gas from the heater will be mixed with the cooler incoming gas by a mixing valve so the operating temperature of the BBS expander will remain constant.

While in accordance with the provisions of the patent statute the preferred forms and embodiments of the invention have been illustrated and described, it will be apparent to those skilled in the art that various changes and modifications may be made without deviating from the inventive concepts set forth above. For example, while electric drive has been described for transferring power from the internal combustion engine and BBS of the invention, in vehicle application or when retrofitting, an internal combustion unit could be attached to the transmission and the BBS to the transmission or to the power take-off of the engine.

What is claimed is:

1. An energy efficient combined cycle power system, comprising:
    an internal combustion engine driving a first motor/generator;
    a heat exchanger;
    means connecting the engine and heat exchanger for providing heat generated by the engine to the heat exchanger;
    a first expander driving a second motor/generator;
    means connecting the heat exchanger and the first expander for providing heat from the heat exchanger to the first expander;
    a third motor/generator; and
    means for providing power between at least one of the first and second motor/generators to the third motor/generator.

2. The power system of claim 1, wherein the engine further comprises a compressor coupled to a second expander and a supercharger mechanically driven by the engine to supply fluid to the compressor.

3. The power system of claim 1, wherein the heat exchanger comprises a fluid heater and a thermal battery, the battery having an inlet port for receiving heated fluid from the first expander; a plurality of fluid ducts passing through the thermal battery and a heat retentive material surrounding the fluid ducts.

4. The power system of claim 3, wherein the power system is a closed cycle system in which the fluid is an inert gaseous fluid.

5. The power system of claim 1, wherein the heat exchanger has first and second fluid exit ports, the first exit port being located within the fluid heater such that fluid exits the heat exchanger through the first exit port prior to entering the thermal battery and the second exit port being located within the thermal battery such that fluid exits the heat exchanger through the second exit port after passing through the thermal battery, and control means for regulating the fluid flow through the first and second exit ports to optimize the temperature of the fluid passing to the second expander.

6. The power system of claim 1, and further comprising a particulate trap oxidizer positioned between the first expander and the heat exchanger.

7. The power system of claim 2, wherein the engine is a screw engine and the compressor is a screw compressor.

8. The power system of claim 1, wherein the engine is a gas turbine.

9. The power system of claim 1, and further comprising:
    wheels driven by the third motor/generator when it is in motor mode and driving the third motor/generator when it is in generator mode;
    braking means coupled to the wheels whereby power is provided between the third motor/generator and the second motor/generator;
    means driven by said second motor/generator for compressing air;
    means for storing the compressed air; and
    means for selectively providing compressed air to the heat exchanger.

10. The power system of claim 1, and further comprising;
wheels driven by the third motor/generator when it is in motor mode and driving the third motor/generator when it is in generator mode;
a plurality of heating elements within the thermal battery;
braking means coupled to the wheels whereby power is provided between the third motor/generator and the heating elements.

11. The power system of claim 10 wherein the heating elements are electromagnetic induction heating elements.

12. A closed energy efficient combined cycle power system, comprising:
an internal combustion engine driving a first motor/generator;
a heat exchanger;
means connecting the engine and heat exchanger for providing heated compressed fluid from the engine to the heat exchanger;
a first expander driving a second motor/generator;
first means connecting the heat exchanger and the first expander for providing heated compressed fluid from the heat exchanger to the first expander;
second means connecting the first expander and the heat exchanger for providing heated compressed fluid from the first expander to the heat exchanger;
and means for providing heated compressed fluid from the heat exchanger to the internal combustion engine; and
means for exhausting excess fluid.

13. The power system of claim 12 wherein said internal combustion engine comprises;
a compressor that receives heated compressed fluid from the heat exchanger;
a combustor that receives and further heats compressed fluid from the compressor; and
a second expander connected to the first motor/generator that receives heated compressed fluid from the combustor and drives the first motor/generator.

14. The power system of claim 13 and further comprising;
a source of liquid oxygen
means for receiving the excess exhaust fluid and condensing it by heat transfer to the liquid oxygen; and
means for storing the condensed exhaust gasses.

15. The power system of claim 12 wherein said engine is a variable output gas turbine.

* * * * *